(12) United States Patent
Norton

(10) Patent No.: US 11,148,303 B2
(45) Date of Patent: Oct. 19, 2021

(54) SENSOR

(71) Applicant: ROLLS-ROYCE plc, London (GB)

(72) Inventor: Andrew D. Norton, Derby (GB)

(73) Assignee: Rolls-Royce plc

( * ) Notice: Subject to any disclaimer, the term of this patent is extended or adjusted under 35 U.S.C. 154(b) by 64 days.

(21) Appl. No.: 16/792,960

(22) Filed: Feb. 18, 2020

(65) Prior Publication Data
US 2020/0282574 A1 Sep. 10, 2020

(30) Foreign Application Priority Data
Mar. 7, 2019 (GB) .................................... 1903049

(51) Int. Cl.
*B25J 17/00* (2006.01)
*B25J 17/02* (2006.01)
*B25J 18/00* (2006.01)
*B25J 19/00* (2006.01)
*B25J 9/16* (2006.01)
*B25J 15/00* (2006.01)
*B25J 18/06* (2006.01)
*C23C 4/12* (2016.01)
*B25J 19/02* (2006.01)
*B25J 9/06* (2006.01)

(52) U.S. Cl.
CPC ........... *B25J 19/0054* (2013.01); *B25J 9/065* (2013.01); *B25J 9/1625* (2013.01); *B25J 15/0019* (2013.01); *B25J 18/06* (2013.01); *B25J 19/02* (2013.01); *C23C 4/12* (2013.01)

(58) Field of Classification Search
CPC .............................. B25J 19/0054; B25J 19/02
See application file for complete search history.

(56) References Cited

U.S. PATENT DOCUMENTS

| | | | | |
|---|---|---|---|---|
| 5,560,362 | A | * 10/1996 | Sliwa, Jr. | ............... A61B 8/546 600/439 |
| 2004/0059226 | A1 | * 3/2004 | Peszynski | ............ A61B 8/4281 600/459 |
| 2005/0154262 | A1 | 7/2005 | Banik et al. | |
| 2009/0030325 | A1 | * 1/2009 | Hyuga | ................. A61B 8/0841 600/459 |
| 2013/0261395 | A1 | * 10/2013 | Ohara | ...................... A61B 1/12 600/141 |

(Continued)

FOREIGN PATENT DOCUMENTS

| | | |
|---|---|---|
| CN | 104627266 A | 5/2015 |
| GB | 2552019 | 1/2018 |

(Continued)

OTHER PUBLICATIONS

European Search Report and Written Opinion completed by the ISA/EP on Jul. 28, 2020 and issued in connection with European Patent Application No. 20156025.7 filed Feb. 7, 2020.

(Continued)

*Primary Examiner* — Jake Cook
(74) *Attorney, Agent, or Firm* — Barnes & Thornburg LLP

(57) ABSTRACT

There is provided a continuum robot comprising a first end, a second end and an elongate body, a sensor arranged at the first end and a cooling jacket adjacent the sensor. The cooling jacket comprises a cavity containing a cooling medium for absorbing heat from the sensor.

12 Claims, 8 Drawing Sheets

(56) References Cited

U.S. PATENT DOCUMENTS

| | | | |
|---|---|---|---|
| 2014/0055596 A1* | 2/2014 | Hatcher, Jr. .............. | B25J 9/065 348/82 |
| 2017/0172402 A1* | 6/2017 | Wakabayashi ......... | A61B 1/018 |
| 2018/0133583 A1 | 5/2018 | Tran et al. | |

FOREIGN PATENT DOCUMENTS

| | | |
|---|---|---|
| JP | H0238950 | 2/1990 |
| RU | 180587 | 6/2018 |
| WO | 2006036067 | 4/2006 |
| WO | 2014031974 | 2/2014 |
| WO | 2016/035364 A1 | 3/2016 |

OTHER PUBLICATIONS

Great Britain search report dated Aug. 17, 2019, issued in GB Patent Application No. 1903049.3.

\* cited by examiner

SENSOR

CROSS-REFERENCE TO RELATED APPLICATIONS

This specification claims the benefit of UK Patent Application No. GB 1903049.3, filed on 7 Mar. 2019, which is hereby incorporated herein by reference in its entirety.

BACKGROUND

Technical Field

The present disclosure concerns a continuum robot for high temperature operation, and the use of a continuum robot in a method of performing a processing operation.

Description of the Related Art

Many devices, engines, machines or plants (hereinafter referred to as products) require inspection, maintenance and repair of internal parts during life. When the internal structure is confined, has restricted access or has complicated internal geometries, access to portions of the internal structure can be difficult. Borescopes can be used, however they have a limited number of degrees of freedom and as such navigating them through a tortuous path inside a device or machine can be time consuming. Robotic devices can be considered to replace borescopes in certain applications.

Continuum robots include snake robots, snake arm robots and elephant trunk robots. A continuum robot may have many degrees of freedom, as well as its own rigidity, such that it can navigate through a tortuous path with greater ease or accuracy. The continuum robot may be a tool with continuous curvature. The continuum robot may be manipulated by, for example, the controlled tensioning of a series of cables, hydraulics or soft robotic actuators. These robots can be deployed into a borescope port, and have working channels through which tools can be deployed such that they can be manipulated to enact repairs on internal parts of a product. As continuum robots become more compact their applicability for use in products with restricted access increases.

Gas turbine engines and power plants (for example nuclear power plants) are examples of products with a complex internal geometry that require, for example, inspection and maintenance of positions inside the complex geometries during operational life. With both gas turbine engines and power plants it is desirable to minimise maintenance time such that operational time is maximised. However continuum robots can be slow to navigate to the required position, thereby increasing maintenance time. It is therefore desirable to have an improved continuum or continuum robot capable of maximising operational time of a product.

SUMMARY

According to an aspect there is provided a continuum robot comprising a first end, a second end and an elongate body, a sensor arranged at the first end and a cooling jacket adjacent the sensor. The cooling jacket comprises a cavity containing a cooling medium for absorbing heat from the sensor.

The first end may be the leading end. The second end may comprise or be located at a base potion. The elongate body may be fed through the base potion such that the length of the elongate body between the first end and the second end increases. Alternatively, the elongate body may be rigidly fixed to the base portion such that the base portion translates as the continuum robot navigates through the structure. The robot may comprise a central axis along its length.

The cooling jacket may comprise a thermal bridge, for example for the transfer of heat from the sensor to the cooling jacket.

The sensor may comprise a CCD or CMOS chip. A CCD or CMOS chip may have an operational temperature range of 80° C. to 100° C.

The sensor may comprise a visual sensor, for example in the visible light or infra-red range.

The cooling jacket may be arranged adjacent the sensor such that the cooling jacket abuts the sensor, or such that any separation between the cooling jacket and the sensor is small relative to a dimension of the cooling jacket (for example such that the majority of heat (e.g. 70%, 80% or 90%) from a portion of a sensor surface that faces the cooling jacket is absorbed by the cooling jacket).

Advantageously, the cooling jacket may absorb heat from the sensor to prevent the sensor reaching a temperature limit, for example whereby exceeding the temperature limit causes degradation of the sensor.

Advantageously, the continuum robot may enable inspection whilst the component is at an elevated temperature, for example during or shortly after operation. Advantageously inspection at elevated temperatures may decrease maintenance time.

Advantageously, the continuum robot may be suitable for providing sensor feedback for a high temperature process. A high temperature process may be, for example, a thermal repair or manufacturing operation.

The cavity may be enclosed. The cooling medium may be a first phase change material having a first phase change temperature.

Advantageously, the first phase change material may absorb heat for a period of time without changing temperature, for example thereby providing improved cooling to the sensor. Advantageously, using a phase change material to cool the sensor may provide a constant temperature heat sink without requiring a feed of cooling medium from the base, for example thereby reducing the complexity and bulk of the continuum robot.

The cooling jacket may further comprise a second cavity. The second cavity may be enclosed. The second cavity may comprise a second phase change material having a second phase change temperature.

The second enclosed cavity may be axially adjacent the first enclosed cavity. Alternatively, the second enclosed cavity may be radially adjacent the first enclosed cavity.

The second enclosed cavity may abut the sensor. The second enclosed cavity may be in thermal contact with the sensor through the first enclosed cavity. For example, the first enclosed cavity may be between the sensor and the second enclosed cavity.

Advantageously, the second phase change material may provide improved cooling to the sensor. Advantageously, the second phase change material may provide an indication, for example during inspection after an operation, of the temperature reached by the sensor.

The cavity and/or the second cavity may be annular and surround the sensor.

The first enclosed cavity and/or second enclosed cavity may surround equal to or more than 50% or 75% of the circumference of the sensor, or for example fully surround the circumference of the sensor. The cavity and/or second cavity may partially or fully axially surround the sensor.

The robot may be capable of fitting through a 30 mm diameter access port, and optionally a 15 mm diameter access port.

The first and/or second phase change materials may have a phase change temperature between 70° C. and below 110° C.

The phase change temperature may be below 110° C., 100° C., 90° C. or 80° C. The phase change temperature may be above 50° C., 60° C., 70° C. or 80° C.

The first phase change material may have a phase change temperature above room temperature but below the temperature at the first position (for example the operating temperature) and/or below the temperature limit of the sensor. The first phase change temperature may refer to the phase change from solid to liquid.

The first and/or second phase change material may be a paraffin wax, non-paraffin organics or hydrated salt.

The phase change material may be one of dinto toluent, $Na_2SiO_3.5H_2O$, paraffin 33-carbons, paraffin 34-carbons, phenylacetic acid, thiosinamine, bromcamphor, durene, methyl bromobenzoate, acetamide, alpha napthol, glautaric acid, p-xylene dichloride, methyl fumarate or catechol.

The first and/or second phase change material may be a metal. The first and/or second phase change material may have a phase change temperature below 200° C. If the phase change temperature is above 100° C. then the phase change material may be quinone, stilbene or lithium. Lithium may have a phase change temperature of 180° C.

The cooling jacket may comprise a supply feed line extending from the second end to the first end for supplying the cavity with coolant.

The continuum robot may further comprise a return feed line extending from the second end to the first end. The supply feed line and return feed line may be for circulating a coolant through the cooling jacket for cooling the sensor.

The supply feed line and/or return feed line may extend along the external or internal parts of the elongate body.

The continuum robot may comprise a pump to circulate the coolant. The cooling jacket may be a closed loop and further comprise a heat exchanger at the second end for cooling the coolant prior to recirculation along to the supply feed line.

Advantageously, circulating a coolant to cool the sensor may provide a constant temperature heat sink for an extended period of time, for example for long or complex inspection or repair processes.

The coolant may be water. The coolant may be air.

The cavity may comprise an opening at the first end for ejection of the coolant through the opening.

The opening may be arranged to direct coolant fluid onto the sensor. Alternatively, the opening may direct coolant into the external environment.

The cavity may have an internal structure such that it is shaped as a heat exchanger (for example where the cavity has a convoluted or serpentine internal shape) for improving the transfer of heat from the sensor to the coolant.

Advantageously, using a supply feed line and an opening may only require one feed line between the first end and the second end, for example whereby the a return feed line is not required.

According to an aspect there is provided a method of performing a processing operation at a first position inside a component, the method comprising the step of navigating the continuum robot as claimed herein to the first position.

The method may further comprise the step of navigating a high temperature processing probe to the first position.

The high temperature processing probe may be a thermal spray nozzle. The thermal spray nozzle may be for example for repair of the internal structure of the component. The high temperature processing probe may produce a thermal spray flame as part of the processing operation.

A thermal spraying flame may have a temperature at the centre of the flame of (for example around) 3000° C. The environment around the sensor may be approximately 100° C., 200° C. or 300° C.

The continuum robot may be for a gas turbine engine. The method may be for performing a processing operation on a gas turbine engine. The component may be a gas turbine engine.

According to an aspect there is provided a deployable probe comprising a sensor as described and/or claimed herein and a cooling jacket as described and/or claimed herein. The sensor or cooling jacket may have any of the features described in relation to the sensors or cooling jackets in the other aspects. The deployable probe may be a continuum robot, a manually operated articulating guide or insertion tube, or a segmented arm robot. The segmented arm robot may have a small number of segments, for example 2, 3 or 4 segments (or for example less than 10 segments). The segmented arm robot may not produce a continuous curvature. The segmented arm robot may be manually controlled. The deployable probe may be suitable for navigating through a tortuous path within a structure.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
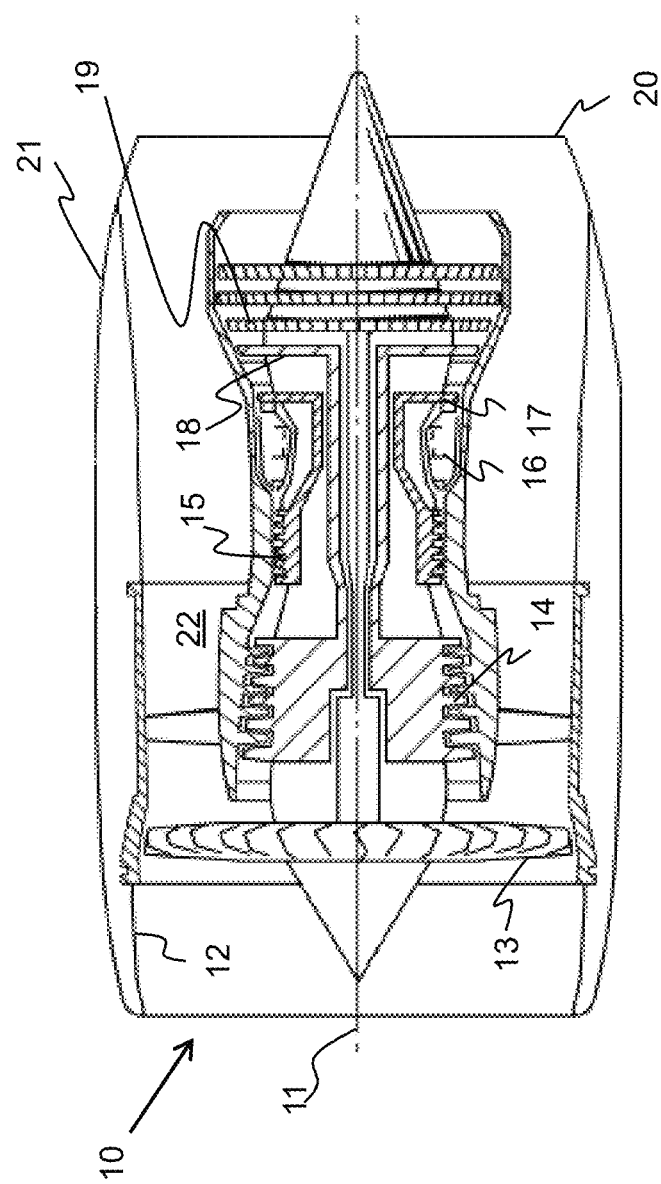
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion gases then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting elongate body.

Other gas turbine engines to which the present disclosure may be applied may have alternative configurations. By way of example such engines may have an alternative number of interconnecting elongate bodies (e.g. two) and/or an alternative number of compressors and/or turbines. Further the engine may comprise a gearbox provided in the drive train from a turbine to a compressor and/or fan.

Figure 2:
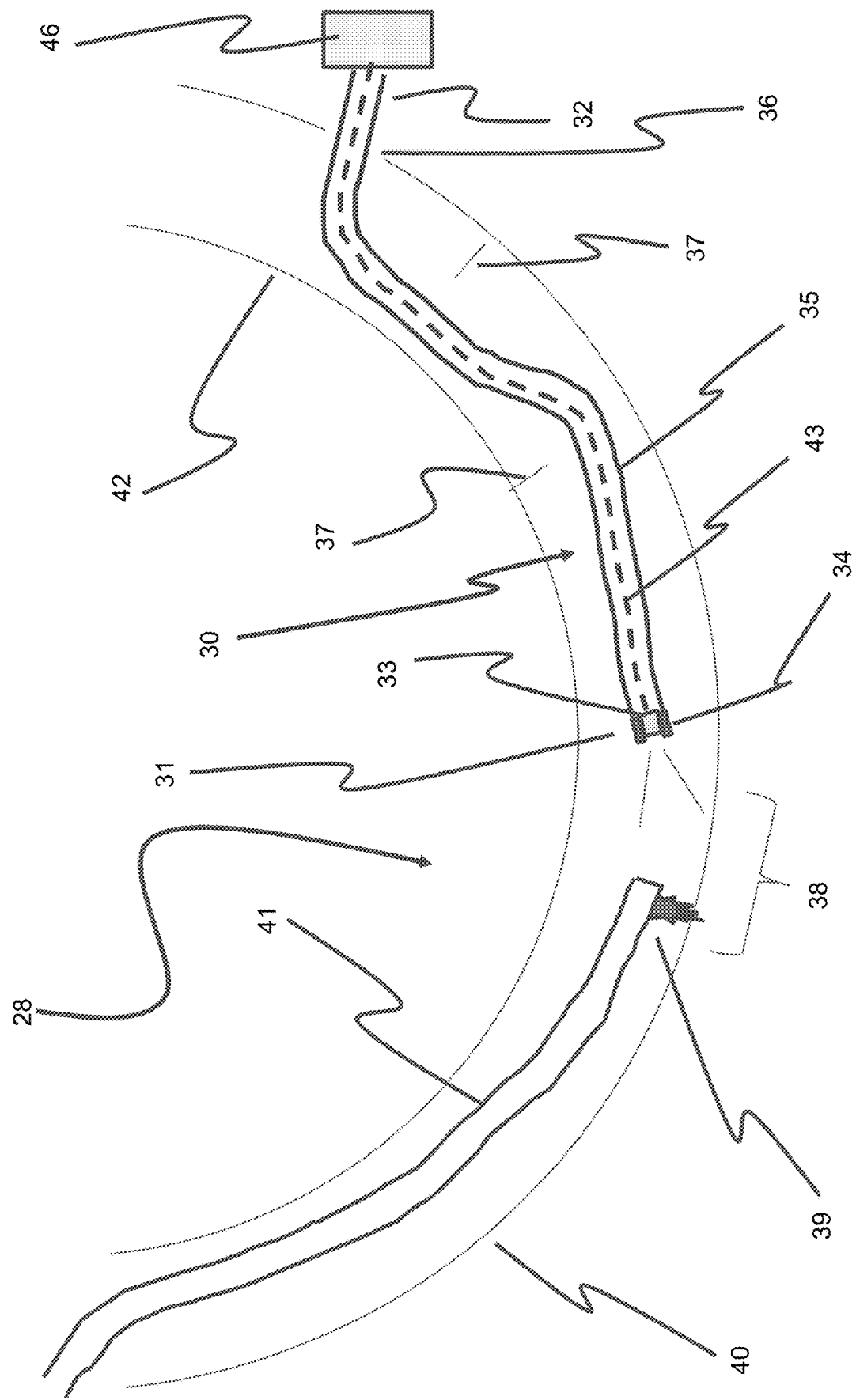
FIG. 2 is a sectional side view of a product where a processing operation is being performed that comprises a continuum robot.

FIG. 2 shows a schematic sectional side view of part of a gas turbine engine 28, for example the gas turbine engine 10 shown in FIG. 1. The part of a gas turbine engine 28 shown may for example represent the combustor section of the gas turbine engine, for example the combustor section 16 of the gas turbine engine 10. FIG. 2 is schematic such that the features described can apply to other arrangements of components, for example in products other than gas turbine engines, for example part of the internal structure of a nuclear reactor.

FIG. 2 shows an inner wall 42 and an outer wall 40. FIG. 2 shows obstructions 37 that create a tortuous path within the structure defined by the inner wall 42 and the outer wall 40. A borescope port 36 provides access to the structure and a deployable probe 30 is shown extending from the borescope port 36 to the first position 38. In the FIG. 2 example the deployable probe 30 is a continuum robot 30. The continuum robot 30 has a first end 31 and a second end 32. The continuum robot has a sensor 33 and a cooling jacket 34 at the first end 31. The continuum robot 30 includes an elongate body 35 that extends between the first end 31 and the second end 32. The continuum robot has a central axis 43. A high temperature processing probe 41 is shown in position at the first position 38. The processing probe 41 has a processing end 39 capable of performing a high temperature operation on, in the FIG. 2 example, the outer wall 40 at the first position 38.

The elongate body 35 of the continuum robot 30 has a high number of degrees of freedom, as shown in FIG. 2, in order to navigate around obstacles, for example obstructions 37. The multiple degrees of freedom allow the continuum robot 30 to enter the borescope port 36 and make multiple changes of direction to navigate through the tortuous path. The elongate body 35 has rigidity to support its own weight and/or maintain a rigid shape. The elongate body 35 has continuous curvature, for example achieved by a high number of sections or segments (for example greater than 10, 20 or 30).

In the FIG. 2 example the borescope port 36 may have a diameter of, for example, 15 mm or less or 30 mm or less. Dedicated access ports for borescopes in gas turbine engines are typically 15 mm or less. However the borescope port 36 may be another access point in a gas turbine engine that may be, for example, 30 mm or less, for example a burner. The first end 31 and elongate body 35 are sized such that they can be fed through the borescope port 36. For example the first end and elongate body may have an axial cross section shape that fits within a 15 mm (or less) or 30 mm (or less) diameter circle.

The second end 32 is shown outside the borescope port in the FIG. 2 example. The second end 32 can be attached to a base 46. Alternatively the second end 32 can be adjacent a base as the continuum robot 30 is fed through the base 46. The first end 34 has a sensor 33, for example a camera, for generating data from the first position 38 when the continuum robot 30 has navigated to the first position 38. FIG. 2 shows the field of view of the sensor 33 encompasses the first position 38.

The processing probe 41 applies a processing operation to the first position 38. For example this processing operation could be a flame spraying system. The flame could be used to deposit patches of thermal barrier coating on a combustor tile of a gas turbine for example.

The sensor 33 has an operational temperature envelope. The sensor may comprise a CCD (charge coupled device) or CMOS (complementary metal oxide semiconductor) chip. A CCD or CMOS chip may have an operational temperature range of 80° C. to 100° C. If the sensor 33 exceeds a maximum temperature the sensor 33 can degrade or be damaged. During operation, the sensor 33 will receive thermal energy and increase in temperature. In the FIG. 2 example, this thermal energy/heat may come from the processing end 39, which may for example be a flame spraying system. A thermal spraying flame may have a temperature at the centre of the flame of (for example around) 3000° C. This may create an environment around the sensor that may be approximately 100° C., 200° C. or 300° C. The cooling jacket 34 absorbs heat from the environment and from the sensor 33 such that the sensor 33 is maintained at a lower temperature, for example within its operational temperature envelope. The cooling jacket absorbs heat from the sensor to prevent overheating of the sensor. In the FIG. 2 example, the cooling jacket 34 is annular and radially surrounds the sensor 33.

In other examples, the processing probe 39 may not be present. For example the heat could then be coming from the product itself, for example due to operation of the product or residual heat from the product shortly after operation of the product.

In a method of performing a processing operation, the continuum robot 30 enters the structure between the first wall 42 and the second wall 40 through the borescope port 36. The continuum robot 30 is fed into the structure, for example by hand or by actuators. The elongate body 35 of the continuum robot 30 articulates such that the continuum robot 30 navigates around the obstructions 37. This process of feeding the continuum robot and navigating around obstructions is continued until the continuum robot 30 arrives at the first position 38.

A processing probe 41, which may also be a continuum robot, navigates by a similar process to the first position 38. The processing end 39 then performs a high temperature processing operation on the first position 38. The continuum robot 30 experiences heat from this processes. The cooling jacket 34 maintains the sensor 33 at a low temperature compared to the environmental temperature such that the sensor 33 does not exceed an operational temperature limit.

In other methods, the continuum robot 30 may navigate to the first position 38 without the processing probe 41, for example where only inspection is required. This method can be performed during operation of a product, for example during operation of a power plant. This method can be performed shortly after operation, for example whilst a gas turbine is cooling down after being operated. In these examples, the cooling jacket 34 ensures that the sensor 33 does not exceed a temperature limit due to heat absorbed from the hot environment.

As discussed in greater detail with reference to FIGS. 4, 5 and 6, the cooling jacket 34 may comprise a phase change material as the cooling medium to slow the increase in temperature of the sensor 33. The sensor can therefore operate within the high temperature environment for longer periods than if the phase change material were not present.

Figure 3:
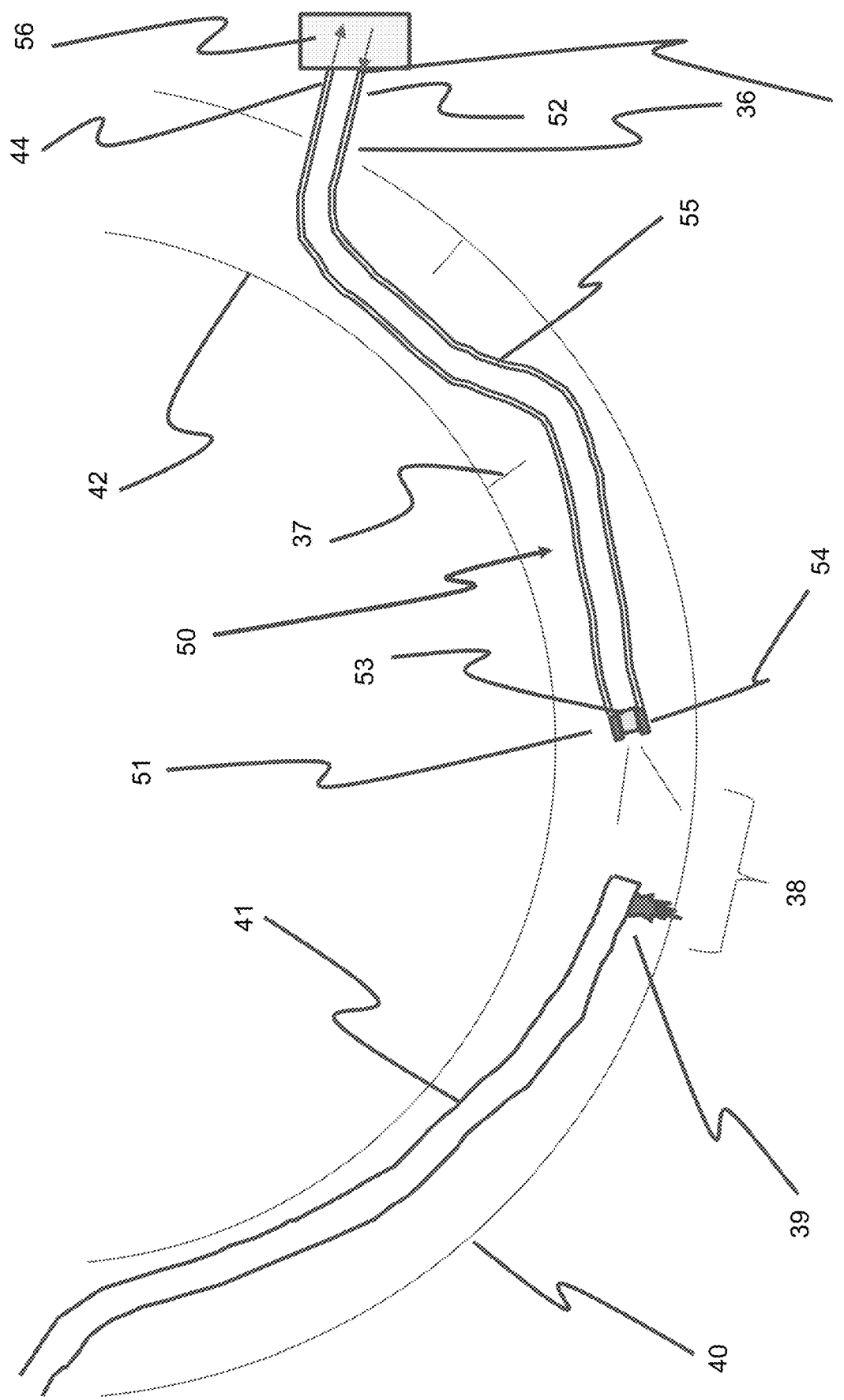
FIG. 3 is a sectional side view of a product where a processing operation is being performed that comprises an alternative continuum robot.

FIG. 3 shows an arrangement similar to FIG. 2 whereby similar features share the same reference numbers. FIG. 3 shows an alternative continuum robot 50. The continuum robot 50 has a first end 51, a second end 52 and a base 56. The continuum robot has a sensor 53 and a cooling jacket 54 at the first end 51. A elongate body 55 extends between the first end 51 and the second end 52.

The continuum robot 50 has a supply feed line 45 and a return feed line 44. In the FIG. 3 the supply feed line 45 and return feed line 44 extend along the outer surface of the elongate body 55. However in other embodiments the supply feed line 45 and/or the return feed line 44 may extend along, for example, a working channel inside the elongate body 55. The supply feed line 45 and return feed line 44 are fluidly connected to the cooling jacket 53 and may form a single component. The supply feed line 45 and return feed line 44 are connected to a base (not shown) at the second end 52 where coolant is supplied from and returned to. Coolant is supplied to the cooling jacket 53 at the first end 51 through the supply feed line 45 where it absorbs heat from the sensor 53 before returning through the return feed line 44 to the second end 52. Alternatively, coolant may be ejected at the first end 51 from the robot 50.

Regarding FIGS. 2 and 3, in other embodiments the first position 38 could be on a different part of the structure. The structure could be a different shape with an alternative tortuous path. The continuum robot 30, 50 and the processing probe 41 are shown coming from different directions in FIG. 2 and FIG. 3, however in other embodiments they could arrive at the first position 38, 58 from the same direction, for example from the same borescope port 36.

Figure 4:
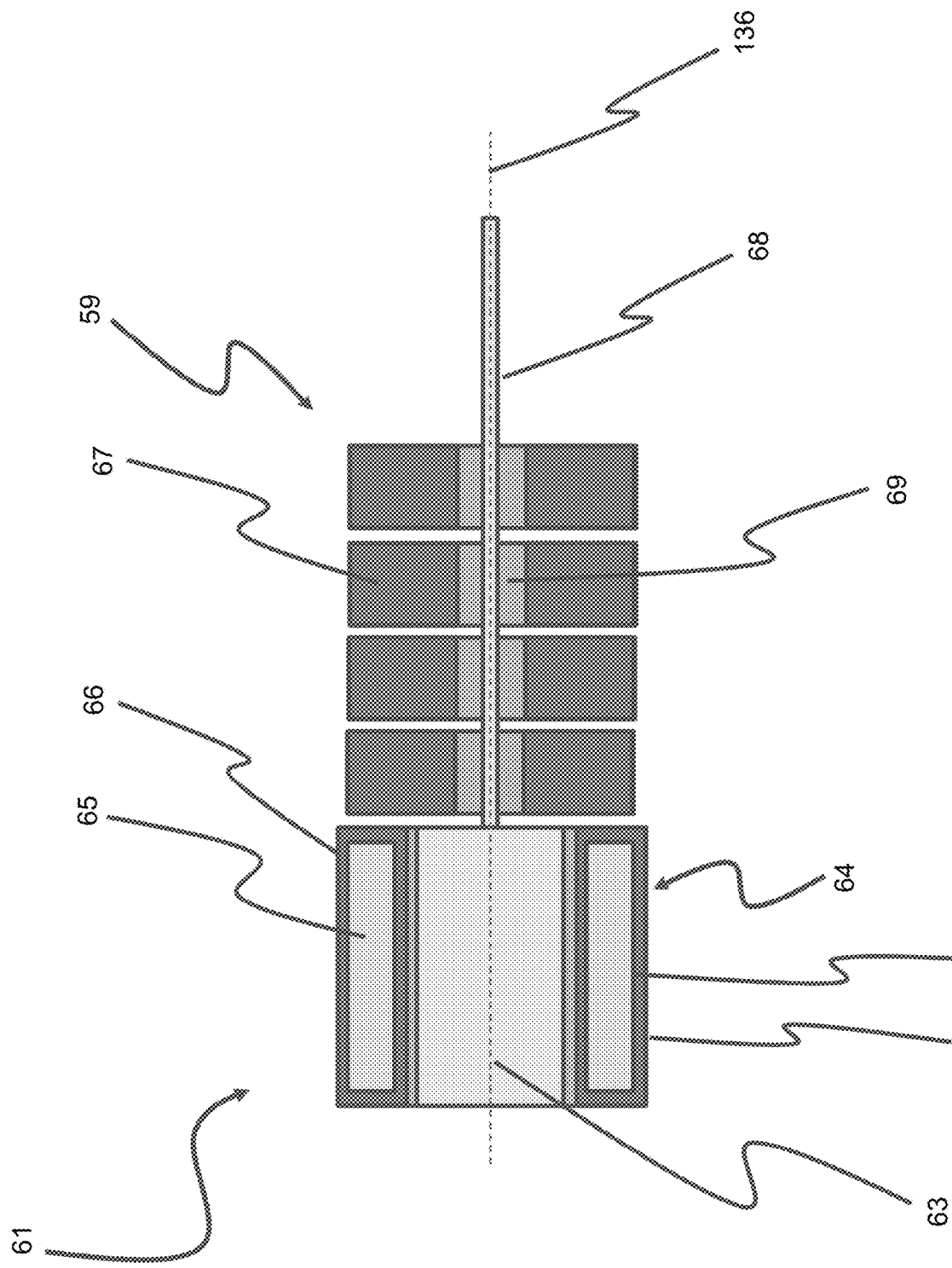
FIG. 4 is a sectional side view of an end of a continuum robot comprising a cooling jacket that comprises a phase change material according to an embodiment.

FIG. 4 shows a more detailed schematic cross section of a first end, for example the first end 31 of FIG. 2. FIG. 4 shows a cooling jacket 64 adjacent a sensor 63. In the FIG. 4 example the cooling jacket 64 is arranged adjacent the sensor 63 such that any separation between the cooling jacket 64 and the sensor 63 is small relative to a dimension of the cooling jacket 64 (for example axial length or radial thickness). In other examples the cooling jacket may abut the sensor or have a thermal bridge between the sensor and the cooling jacket. The cooling jacket has an enclosed cavity 66 and a phase change material 65. A part of the elongate body 59 is shown comprising a plurality of sections 67. The sections 67 continue along the length of the elongate body. The sections 67 allow the elongate body 59 to flex as the sections 59 are joined to each other by a joint that can move in multiple degrees of freedom. A sensor cable 68 is shown passing along a working channel 69. FIG. 4 shows a central axis 136.

When the sensor 63 experiences a high temperature environment heat is absorbed by the phase change material 65. The phase change material 65 will increase in temperature until it reaches a phase change temperature. The phase change temperature is the temperature at which the material starts to change phase, for example from a solid to a liquid. Once the phase change temperature is reached the phase change material 65 will absorb further heat for a period of time without the temperature increasing. The phase change from one phase to another, for example solid to liquid, occurs at a single temperature and requires an amount of heat energy. Whilst the phase change material 65 is changing phase it is providing a constant temperature heat sink to the sensor 63, for example below the environmental temperature.

The enclosed cavity 66 has an inner radial surface 135 and an outer radial surface 134. The inner radial surface 135 and/or outer radial surface 134 may have surface features that increase the surface area of the inner radial surface 135 and/or outer radial surface 134 for improving heat transfer into and/or out of the enclosed cavity 66. For example the surface features may be fins, studs or divots.

In the FIG. 4 example the enclosed cavity 66 is annular and radially surrounds the sensor 63. The enclosed cavity 66 has an axial length that is substantially the same as the axial length of the sensor 63. In other embodiments the enclosed cavity 66 may have an axial length that is greater than or less than the axial length of the sensor 63.

Figure 5:
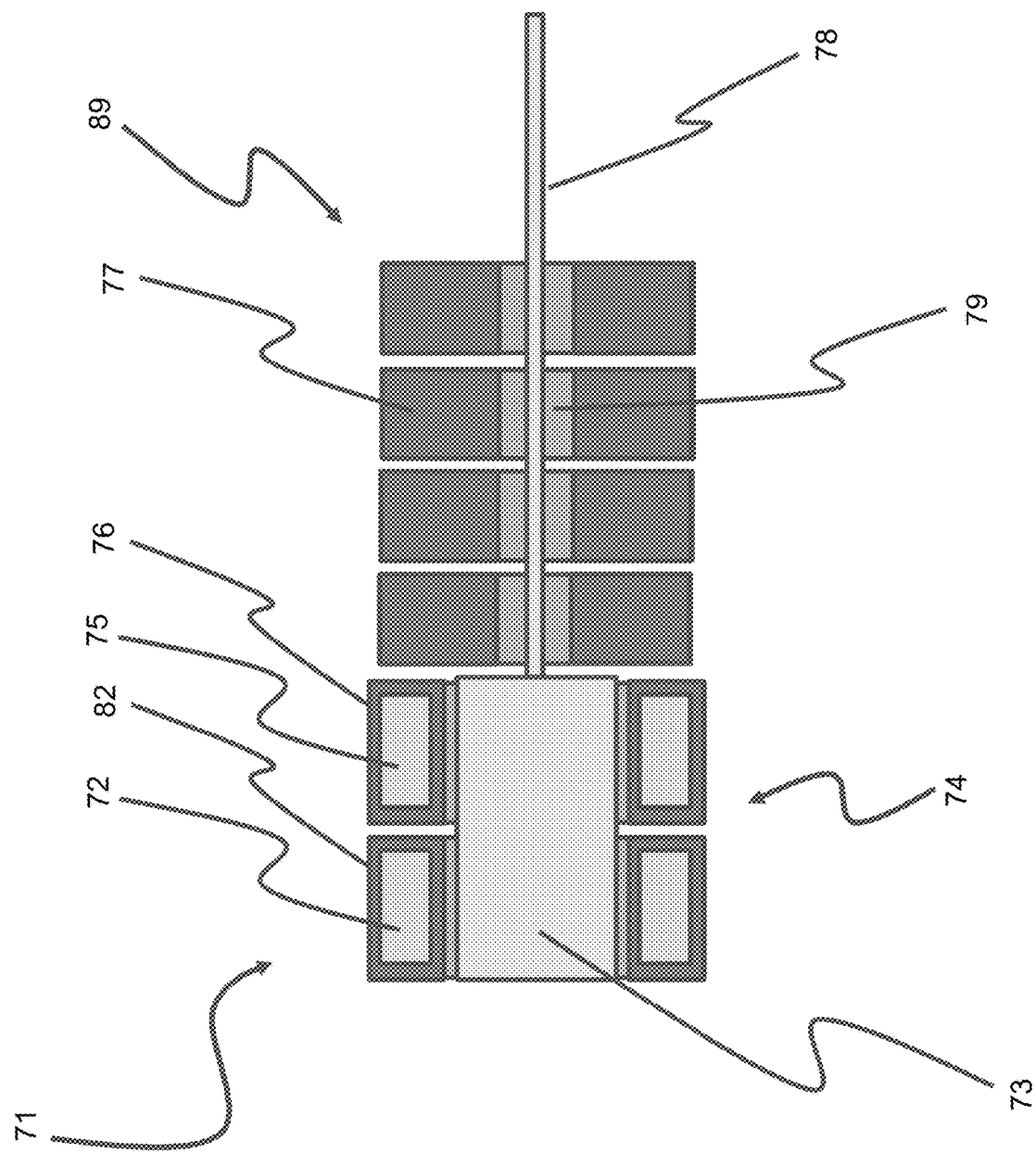
FIG. 5 is a sectional side view of an end of a continuum robot comprising a cooling jacket that comprises a phase change material according to an embodiment.

FIG. 5 shows an alternative arrangement of a first end 71. In the FIG. 5 example a cooling jacket 74 is shown adjacent a sensor 73. The cooling jacket 74 has a first enclosed cavity 82 with a first phase change material 72 and a second enclosed cavity 76 with a second phase change material 75. Similar to the FIG. 4 example a part of the elongate body 89 is shown comprising a plurality of sections 77. A sensor cable 78 is shown passing along the working channel 79.

In the FIG. 5 example each cavity is annular and radially surrounds the sensor 73. The first enclosed cavity 82 is axially adjacent the second enclosed cavity 76. Both the first enclosed cavity 82 and second enclosed cavity 76 are axially positioned such that they are adjacent the sensor 73.

The first phase change material 72 and second phase change material 75 may have the same or different phase change temperatures. Where the phase change temperatures are different they may provide sequential heat sinks. For example, the first phase change material 72 provides a heat sink at a first temperature, and then once the phase change is complete the second phase change material reaches its phase change temperature and then provides a heat sink at that second temperature. Alternatively, for example when the front of the first end 71 is hottest, the phase change temperatures may be tuned to account for the different operational temperatures they experience in order to absorb heat at the same time. For example, the phase change temperature of the phase change material that experiences cooler operational temperatures may have a lower phase change temperature such that it changes phase at the same time as a phase change material that experiences hotter conditions. Advantageously using two phase change materials with different phase change temperatures may provide more controlled or even temperature control of the sensor 73.

Figure 6:
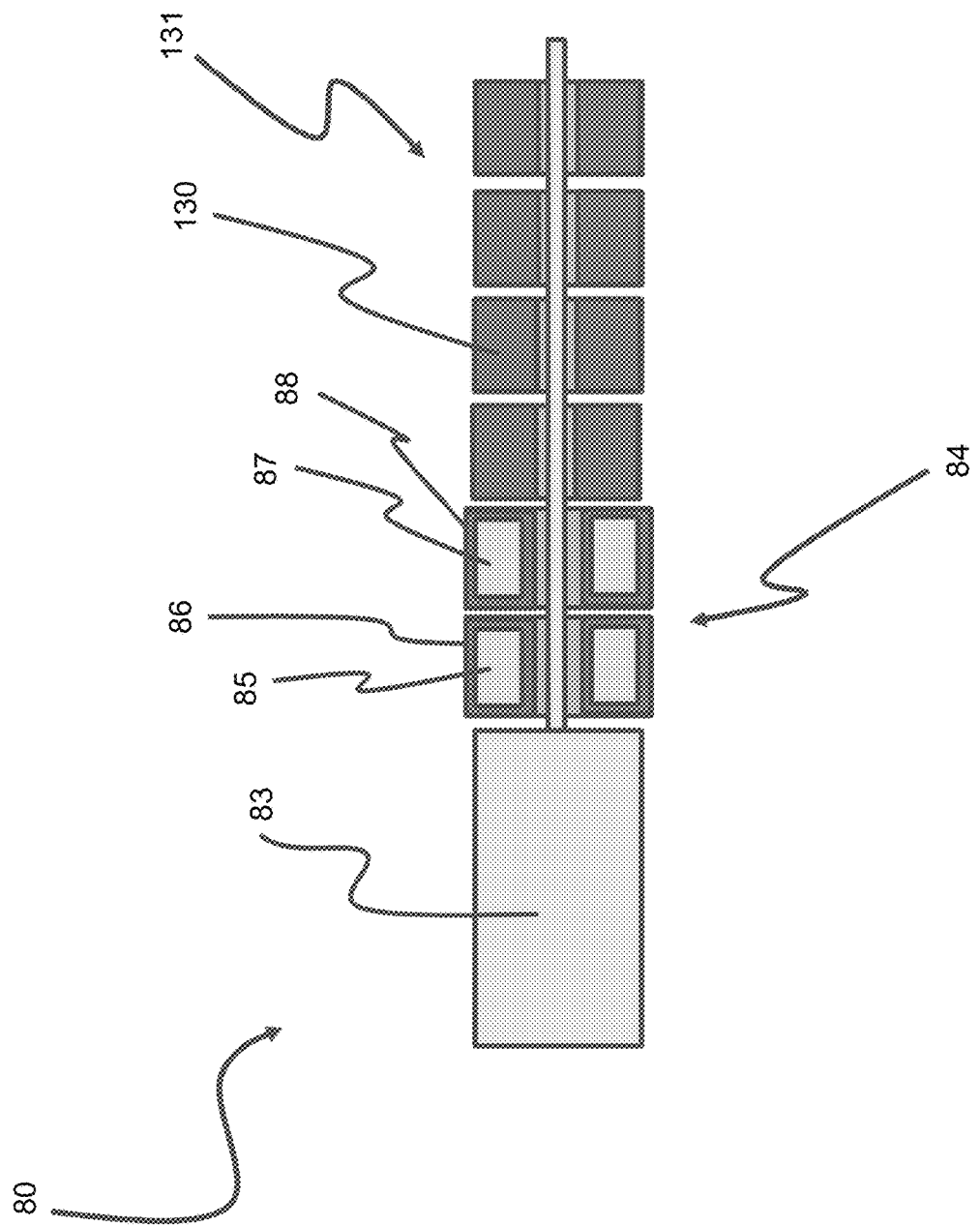
FIG. 6 is a sectional side view of an end of a continuum robot comprising a cooling jacket that comprises a phase change material according to an embodiment.

FIG. 6 shows an alternative arrangement of a first end 80. The first end 80 has a sensor 83 and a cooling jacket 84 adjacent the sensor 83. The cooling jacket 84 has a first enclosed cavity 86 with a first phase change material 85 and a second enclosed cavity 88 with a second phase change material 87. A portion of a elongate body 131 is shown with sections 130.

In the FIG. 6 example the cooling jacket 84 is axially adjacent the sensor 83. For example the cooling jacket 84 is axially separated from the sensor 83 by a small distance relative to an outer dimension of the cooling jacket 84. In other embodiments the cooling jacket 84 may abut the sensor 83. The phase change materials will therefore provide cooling (e.g. provide a heat sink) to the rear of the sensor 83. In other examples there may be greater or fewer numbers of enclosed cavities and/or phase change materials.

Figure 7:
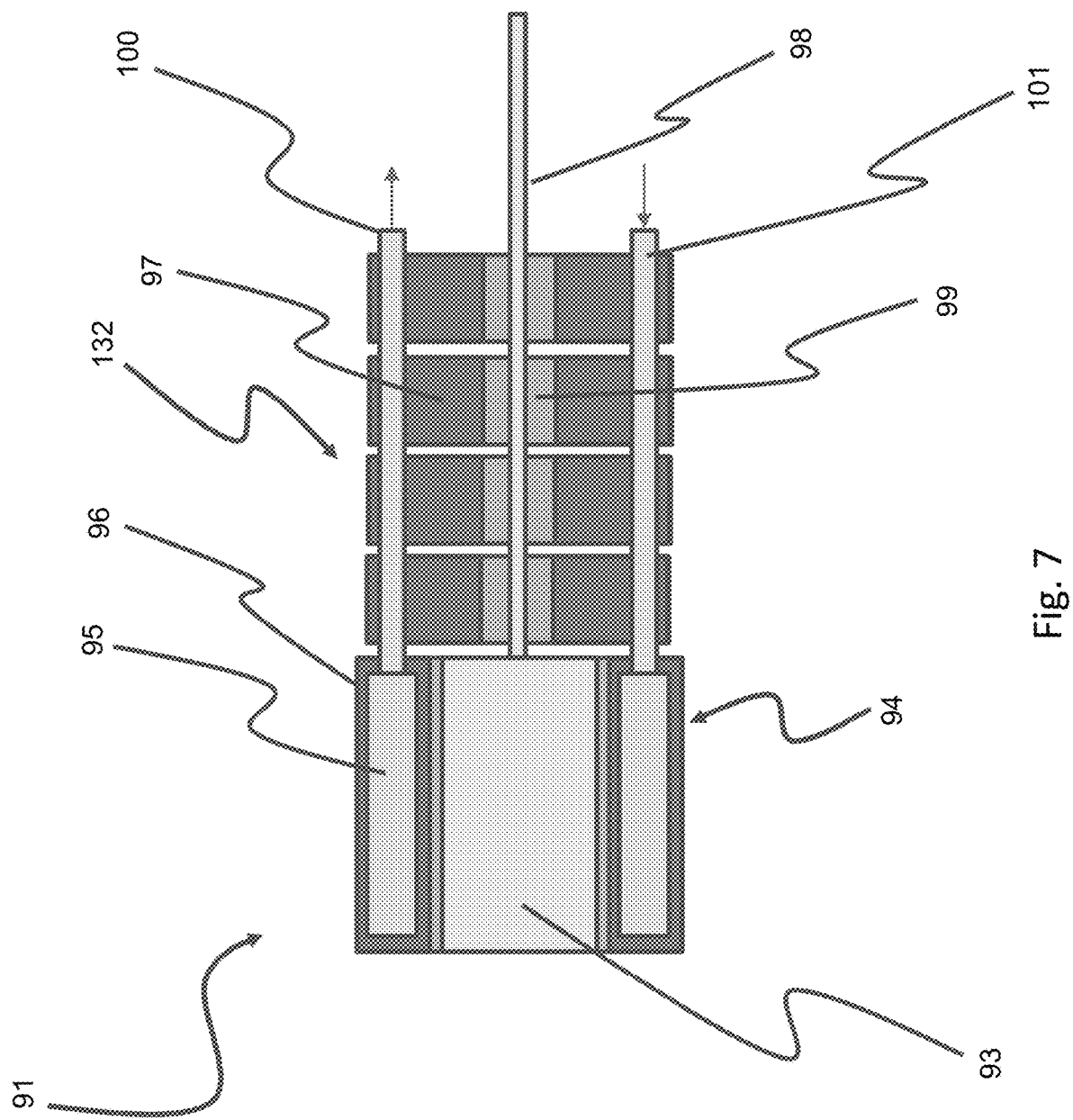
FIG. 7 is a sectional side view of an end of a continuum robot comprising a cooling jacket that comprises a supply feed line and a return feed line according to an embodiment.

FIG. 7 shows an alternative arrangement of a first end 91. The first end 91 has a sensor 93 and a cooling jacket 94. The cooling jacket has a cavity 96. A portion of an elongate body 132 is shown with sections 97 and a working channel 99. A sensor cable 98 passes through the working channel 99. A supply feed line 101 and return feed line 100 are shown fluidly connected to the cavity 96. The cavity 96 is axially aligned with and radially surrounds the sensor 93. In other examples the cavity 96 may have a different position adjacent the sensor 93.

Coolant 95, which may be water, is circulated to the cavity 96 from the supply feed line 101 to the return feed line 100. Whilst in the cavity 96 the coolant 95 absorbs heat from the sensor 93 to cool the sensor.

In the FIG. 7 example the supply feed line 101 and return feed line 100 are shown passing through a radially outer part of the sections 97, however in other embodiments the supply feed line 101 and/or return feed line 100 may be arranged along the elongate body 132 radially outside of the sections 97 (for example attached to the outside surface of the sections 97) or in the working channel 99. The control of the elongate body 132 may be modified to account for the change in rigidity caused by the supply feed line and/or return feed line.

Figure 8:
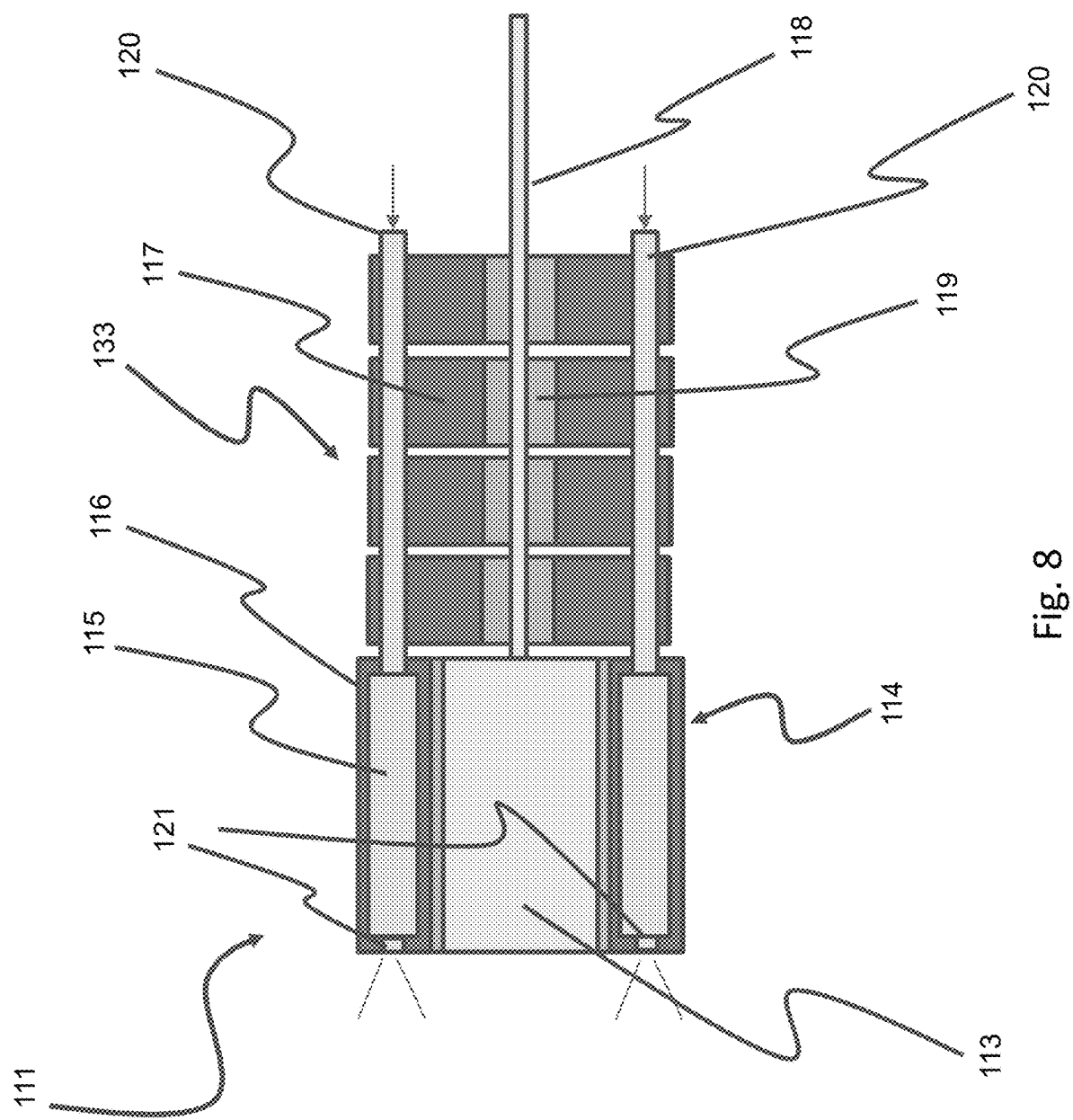
FIG. 8 is a sectional side view of an end of a continuum robot comprising a cooling jacket that comprises a supply feed line and an opening according to an embodiment.

FIG. 8 shows an alternative arrangement of a first end 111. The first end 111 has a sensor 113 and a cooling jacket 114. The cooling jacket has a cavity 116. A portion of an elongate body 133 is shown with sections 117 and a working channel 119. A sensor cable 118 passes through the working channel 119. Supply feed lines 120 are shown fluidly connected to the cavity 116, in a similar way to the supply feed line 101 in FIG. 7. The cavity 116 is axially aligned with and radially surrounds the sensor 113. In other examples the cavity 116 may have a different position adjacent the sensor 113. The cavity 116, in the FIG. 8 example, has openings 121 that fluidly connect the cavity 116 with the external environment.

Coolant 115, which may be air, is supplied to the cavity 116 through the supply feed lines 120 before being ejected through the openings 121. Whilst in the cavity 116, the coolant 115 absorbs heat from the sensor 113 to cool the sensor (e.g. provide a heat sink to the sensor).

In the FIG. 8 example there are two supply feed lines 120 shown, however in other examples there may be a greater or fewer number of supply feed lines. The openings 121 may be small and distributed around the circumference of the cavity 116. The openings 121 may provide a flow restriction or nozzle suitable for controlling the rate of flow of air through the cavity 116 to improve heat transfer to the cavity 116. In other examples the cavity 116 may have a different internal structure, for example an internal structure that shapes or divides the cavity into a serpentine shape (e.g. a heat exchanger shape) such that it improves heat transfer.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A continuum robot comprising:
   a first end, a second end and an elongate body;
   a sensor arranged at the first end;
   a cooling jacket adjacent the sensor comprising a cavity containing a cooling medium for absorbing heat from the sensor,
   wherein the cavity is enclosed, and wherein the cooling medium is a first phase change material having a first phase change temperature, and
   wherein the cooling jacket further comprises a second cavity, wherein the second cavity is enclosed, and wherein the second cavity comprises a second phase change material having a second phase change temperature.

2. The continuum robot according to claim 1, wherein the cavity and/or the second cavity are annular and surround the sensor.

3. The continuum robot according to claim 1, wherein the robot is capable of fitting through a 30 mm diameter access port.

4. The continuum robot according to claim 1, wherein the first and/or second phase change materials have a phase change temperature between 70° C. and 110° C.

5. The continuum robot according to claim 1, wherein the first and/or second phase change material are a paraffin wax, non-paraffin organics or hydrated salt.

6. The continuum robot according to claim 1, wherein the cooling jacket comprises a supply feed line extending from the second end to the first end for supplying the cavity with coolant.

7. The continuum robot according to claim 6, further comprising a return feed line extending from the second end to the first end, wherein the supply feed line and return feed line are for circulating a coolant through the cooling jacket for cooling the sensor.

8. The continuum robot according to claim 7, wherein the coolant is water.

9. A continuum robot comprising:
   a first end, a second end and an elongate body;
   a sensor arranged at the first end;
   a cooling jacket adjacent the sensor comprising a cavity containing a cooling medium for absorbing heat from the sensor,
   wherein the cavity extends around a circumference of the sensor and surrounds at least 50% of the circumference of the sensor.

10. The continuum robot of claim 9, wherein the cavity extends entirely around a circumference of the sensor and surrounds the circumference of the sensor.

11. The continuum robot of claim 9, wherein the cavity is enclosed, and wherein the cooling medium is a first phase change material having a first phase change temperature, and wherein the cooling jacket further comprises a second cavity, wherein the second cavity is enclosed, and wherein the second cavity comprises a second phase change material having a second phase change temperature.

12. The continuum robot according to claim 3, wherein the robot is capable of fitting through a 15 mm diameter access port.

* * * * *